(12) United States Patent
Fintescu et al.

(10) Patent No.: US 8,714,905 B2
(45) Date of Patent: May 6, 2014

(54) METHOD AND A DEVICE FOR BALANCING PRESSURE IN A TURBOJET BEARING ENCLOSURE

(75) Inventors: Ion Fintescu, Paris (FR); Laurent Gille, Dammarie les Lys (FR); Jean-Pierre Mourlan, Nogent sur Marne (FR)

(73) Assignee: SNECMA, Paris (FR)

( * ) Notice: Subject to any disclaimer, the term of this patent is extended or adjusted under 35 U.S.C. 154(b) by 719 days.

(21) Appl. No.: 12/934,784

(22) PCT Filed: Mar. 24, 2009

(86) PCT No.: PCT/FR2009/050500
§ 371 (c)(1),
(2), (4) Date: Feb. 11, 2011

(87) PCT Pub. No.: WO2009/125120
PCT Pub. Date: Oct. 15, 2009

(65) Prior Publication Data
US 2011/0188992 A1    Aug. 4, 2011

(30) Foreign Application Priority Data

Mar. 26, 2008  (FR) ...................................... 08 51923

(51) Int. Cl.
*F04D 27/02*     (2006.01)
(52) U.S. Cl.
USPC .................... 415/1; 415/25; 415/36; 415/112
(58) Field of Classification Search
USPC ................. 415/1, 25, 36, 111–113, 176, 180, 415/229–231; 251/303; 137/527, 518, 137/527.8; 184/6.11
See application file for complete search history.

(56) References Cited

U.S. PATENT DOCUMENTS 4,433,539 A * 2/1984 Norris et al. ................. 60/39.08
5,114,446 A     5/1992 Giersdorf et al.
(Continued)

FOREIGN PATENT DOCUMENTS

| JP | 58-204936 A | 11/1983 |
|----|-------------|---------|
| JP | 2007-224912 A | 9/2007 |
| WO | 01 31235 | 5/2001 |

OTHER PUBLICATIONS

Japanese Office Action issued May 14, 2013 in Patent Application No. 2011-501276 (English Translation only).

(Continued)

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

A pressure-balancing device for balancing pressure in at least one bearing enclosure of a turbojet, the enclosure including a mechanism feeding the bearing with lubricating liquid, an air intake, at least one sealing system placed between the stator and the rotor in front of and/or behind the bearing, a recovery mechanism recovering the lubricating liquid, and a removal mechanism removing the mixture of air and of traces of lubricating liquid towards a venting circuit. Downstream from the bearing enclosure and in the venting circuit, the balancing device includes a regulator system regulating the air removal flow rate, thereby enabling the flow rate to be variable as a function of the speed of the engine, to remain non-zero, and, at high speeds, to be lower than when the regulator system is not included.

15 Claims, 7 Drawing Sheets

(56) References Cited

U.S. PATENT DOCUMENTS

| | | |
|---|---|---|
| 5,257,903 A | 11/1993 | Allmon et al. |
| 6,033,450 A * | 3/2000 | Krul et al. ............... 55/345 |
| 6,330,790 B1 | 12/2001 | Arora et al. |
| 6,851,255 B2 * | 2/2005 | Aitchison et al. ............ 60/39.83 |
| 2006/0213726 A1 | 9/2006 | Gekht et al. |
| 2006/0267290 A1 | 11/2006 | Spencer et al. |
| 2007/0180830 A1 * | 8/2007 | Granitz et al. ............... 60/772 |
| 2007/0193276 A1 * | 8/2007 | Corattiyil et al. ............ 60/782 |
| 2007/0235088 A1 * | 10/2007 | Klein .................... 137/512.15 |

OTHER PUBLICATIONS

International Search Report issued Nov. 11, 2009 in PCT/FR09/050500 filed Mar. 24, 2009.

* cited by examiner

METHOD AND A DEVICE FOR BALANCING PRESSURE IN A TURBOJET BEARING ENCLOSURE

The invention relates to a method and to a device for balancing pressure in at least one bearing enclosure of a turbojet.

In the field of turbojet engines, enclosures are used, each of which contains a rolling bearing between a portion that is mounted to rotate and a portion that is stationary, such an enclosure having oil circulation serving to lubricate and to cool the components.

Below, the adjectives "stationary", "movable", and "movable in rotation" describe the absence of the movement or the movement of the part or portion under consideration relative to the turboject as a whole.

In order to ensure that the oil remains contained inside the enclosure, before it is recovered and re-circulated in the circuit, and in order to prevent it from polluting other cavities of the engine flow section, the air inside said enclosure is pressurized.

Unfortunately, since that air has already flowed through the upstream stages of the engine, it has already been compressed and then injected into the enclosure at a pressure close to atmospheric pressure, so that it participates little or not at all in the thrust delivered by the engine. That results in an impact that is unfavorable in terms of performance, and in particular in terms of fuel consumption, for a required level of thrust.

Usually, in order to reduce the flow rates of air entering the enclosures and thus in order to reduce fuel and oil consumption, endeavors are made to develop seals that are as leaktight as possible at the boundaries of the enclosures. Seals of the labyrinth type that are not very leaktight can therefore be replaced by advanced sealing systems that offer higher performance but that are more complex and more costly, such as brush seals or carbon-ring seals.

Furthermore, with such advanced sealing systems, other drawbacks are encountered because, in addition to their increased cost, they suffer from major risks of failure due to their increased technical complexity compared with labyrinth seals: fragility of assembly, pollution of the oil enclosure with wear particles, and life shorter than the lives of labyrinth seals.

Also, it is observed that, since air pressure varies with varying engine speed, situations result that differ widely as a function of engine speed. A minimum air flow rate is delivered into the enclosure at low engine speeds (idling) so as to pressurize the enclosure sufficiently and so as to avoid oil leaks. That results in major pressure differences at the boundaries of the seals at high engine speeds (cruising speed or full-throttle) because an air flow rate that is particularly high is then delivered due to the air being compressed to a greater extent at high speed, whereas the back pressure in the enclosure remains hardly any higher than atmospheric pressure.

Since the seals are subjected to large pressure differences, and, in addition, to major variations in said pressure differences, they tend to wear faster, and hence to suffer from an increased risk of failure.

An object of the present invention is to provide a solution making it possible to overcome the drawbacks of the prior art, and in particular to offer the possibility of providing a pressurization system for engine enclosures that makes it possible for the pressure difference at the boundaries of the seals to vary to a lesser extent as a function of the speed of the engine.

To this end, the present invention provides a pressure-balancing device for balancing pressure in at least one bearing enclosure of a turbojet, said enclosure being defined between a rotor mounted to rotate about an axis and a stator, generally formed of a set of stationary walls, and including a bearing support on which a bearing is mounted that bears against said rotor, said enclosure including means for feeding said bearing with lubricating liquid, air intake means bringing into the enclosure pressurized air coming from a pressurization circuit (formed by tapping the driving gas stream), at least one sealing system placed between the stator and the rotor in front of and/or behind said bearing, recovery means for recovering the lubricating liquid (via one or more recovery circuits for re-using the lubricating liquid) and removal means for removing the air, after being separated from the lubricating liquid and therefore containing only traces of lubricating liquid, towards a venting circuit.

In characteristic manner, downstream from the bearing enclosure and in the venting circuit, said pressure-balancing device includes a regulator system for regulating the flow rate of air removal as a function of engine speed, thereby enabling said flow rate to be variable as a function of engine speed, to remain non-zero, and, at high speeds, to be lower than when the regulator system is not included, i.e. is absent.

Below, the term "downstream from the enclosure" is relative to the flow direction of air leaving the enclosure under consideration.

In this way, it can be understood that, by setting up head loss, downstream from the enclosure, which head loss is variable as a function of the engine speed, it is possible to maintain a minimum pressure difference regardless of the engine speed, and, advantageously, a pressure difference that is substantially constant at the sealing boundaries of the enclosure.

By means of the regulator system, the value obtained for the air removal flow rate is always low, and, above all, the value of the air removal flow rate is low at high engine speeds so that, at high speeds, the air removal flow rate is lower than it would be in the absence of the regulator system.

When the regulator system is absent (as it is in the prior art solutions that do not make provision for a system having a flow section that is variable as a function of engine speed, i.e. as a function of the speed of rotation of the rotor), the greater the difference between the source pressure delivered by the compressor and the back pressure downstream from the venting circuit (in general equal to ambient pressure), which pressure difference increases with increasing engine speed, the higher the mass flow rate of air removed by venting. It should be noted that, when the regulator system is absent, the air venting mass flow rate compared with the primary gas stream flow rate (generally referenced W25) tends to be relatively constant as a function of engine speed since both the air venting mass flow rate and the primary gas stream flow rate increase with increasing engine speed.

In accordance with the invention:
for low engine speeds, the air flow rate remains non-zero, and is as low as possible compared with a situation in which the regulator system is absent; typically, such low speeds lie in the range stopped to idling, where the air pressure delivered by the compressor delivering the pressurization air for the enclosures of the engine is low, thereby requiring a venting path with as little obstruction as possible, in order to reduce head losses to as low as possible along the venting circuit, and in order thereby to have bearing enclosures that are sufficiently pressurized;
for higher engine speeds, the air flow rate is advantageously lower than in a situation when the system for regulating the air flow rate is absent; typically such higher engine speeds are speeds of rotation lying above "idling on the ground" and in particular for situations in which the engine is operating at full-throttle, for climbing, or for cruising, in which situations the engine enclosures are pressurized with a considerable margin due to the high air pressure delivered by the compressor for pressurizing the bearing enclosures.

Thus, by means of a simple solution, firstly the sealing systems are subjected to less stress, and secondly, by variably reducing the head loss, the air pressure in the enclosures is increased, thereby making it possible to reduce the flow rates of air entering said oil enclosures, resulting in savings in the amount of air tapped from the driving gas stream.

In addition to reducing the quantity of air serving to pressurize the oil enclosures, this solution also offers the additional advantage of making it possible to reduce the consumption of oil that is entrained by the flow of air to the venting circuit.

In addition, by increasing the pressures in the enclosures, the suction pressures of the oil recovery pumps of the venting circuit are also increased, and it is therefore possible to reduce the capacity and thus the size and the weight of the pumps.

Overall, by means of the solution of the present invention, it is possible to obviate the need to use advanced sealing systems, the solution of the invention being simple to implement and not generating any risk of severe failure because the non-zero minimum air flow rate guarantees removal of at least a minimum amount of pressurization air.

Advantageously, said regulator system is such that the air removal flow rate is variable as a function of engine speed. The regulator system is such that the value obtained for the air removal flow rate is always low, and, above all, the value of the air removal flow rate is low at high engine speeds so that, at high speeds, the air removal flow rate is lower than it would be in the absence of the regulator system.

In a preferred configuration, said regulator system is disposed in a duct of the venting circuit, and, as a function of engine speed, it changes the flow section of the duct between a minimum flow section and a maximum flow section.

In this way, it is possible to adapt the pre-existing venting circuit so as to add a regulator system of the invention thereto. In addition, it is possible to place the regulator system downstream from one or more bearings, or downstream from all of the bearings.

Advantageously, in another configuration, said regulator system has a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position.

In this way, it is simple to vary the flow section and thus to vary the head loss in the duct of the venting circuit.

Preferably, said minimum flow section is not zero.

The present invention also provides a method of balancing pressure in at least one bearing enclosure of a turbojet, said enclosure being defined between a rotor mounted to rotate about an axis and a stator, generally formed of a set of stationary walls, and including a bearing support on which a bearing is mounted that bears against said rotor, said enclosure including means for feeding said bearing with lubricating liquid, air intake means bringing into the enclosure pressurized air coming from a pressurization circuit (formed by tapping the driving gas stream), at least one sealing system placed between the stator and the rotor in front of and/or behind said bearing, recovery means for recovering the lubricating liquid (via one or more recovery circuits for re-using the lubricating liquid) and removal means for removing the air after being separated from the lubricating liquid and that therefore contains only traces of lubricating liquid, via a venting circuit.

In characteristic manner, the method consists in regulating, as a function of engine speed, the air removal flow rate downstream from the bearing enclosure, in the venting circuit, said air flow rate being variable as a function of the speed of the engine, non-zero, and, at high speeds, lower than in the absence of the pressure-balancing method, i.e. when the flow rate of air is not regulated.

Preferably, the flow rate of air is removed in the venting circuit with an air flow rate that is variable as a function of the speed of the engine.

In particular, provision is made for the air removal flow rate to be at a non-zero minimum value for low engine speed and to be variable, increasing with increasing engine speed up to a maximum air removal flow rate.

In practice, the air removal mass flow rate does not necessarily increase continuously with increasing engine speed over the entire range of the engine speeds: the tendency is to have the air flow rate increase progressively as a function of the engine speed over the entire range covering low engine speeds (or low rotor rotation speeds), and then, for higher engine speeds, to have the air flow rate continue to increase from some point, but more slowly, or to remain constant and/or, optionally, to have the air flow rate reduce a little, thereby always leading to a maximum air removal flow rate for a given high engine speed.

In this way, the air removal flow rate is at a non-zero minimum value for low engine speeds and is variable, increasing with increasing engine speed until the highest engine speeds are reached (of the full-throttle, climbing, or cruising types), and the method and the device for balancing pressure advantageously make it possible to limit said increase in flow rate with increasing engine speed.

Other advantages and characteristics of the invention appear on reading the following description given by way of example and with reference to the accompanying drawings, in which.

Figure 1:
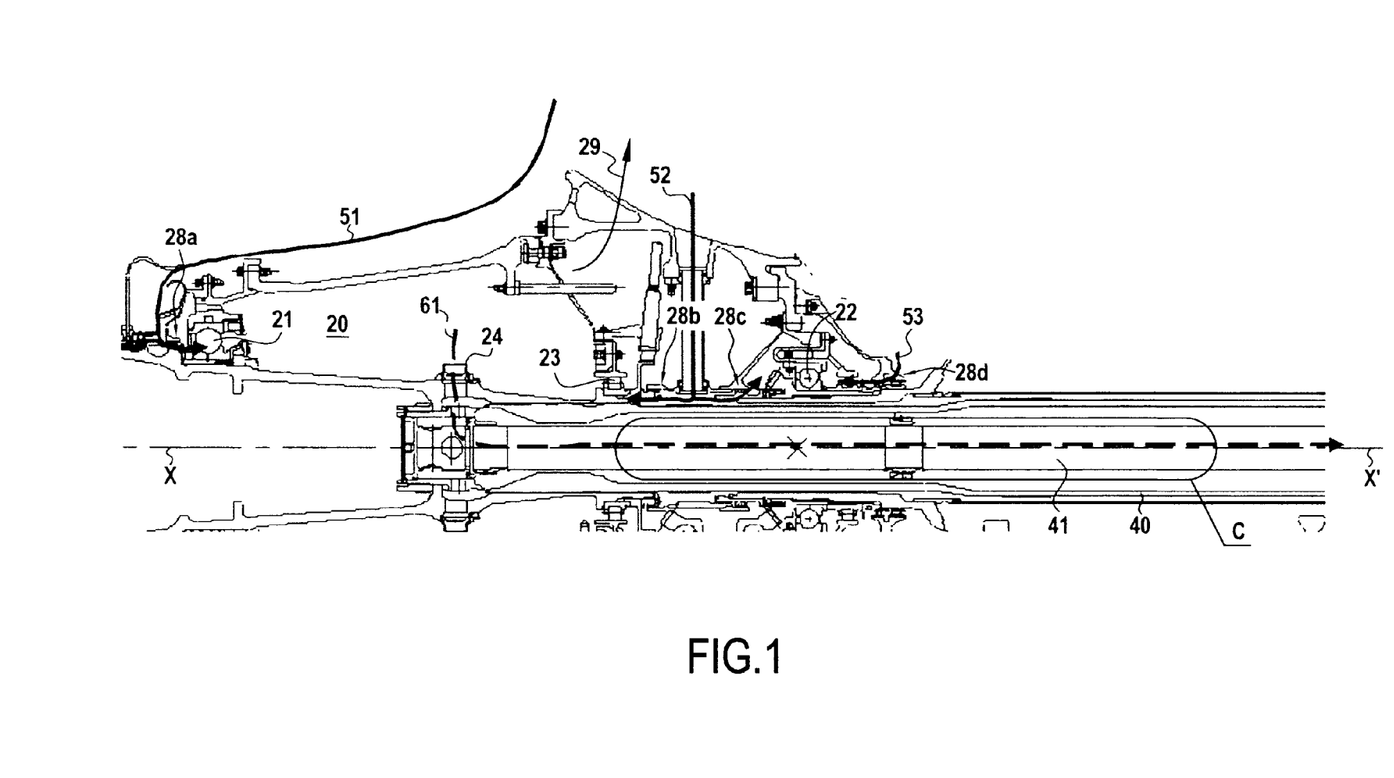
FIG. 1 is an axial section view of a prior art front enclosure.
Figure 2:
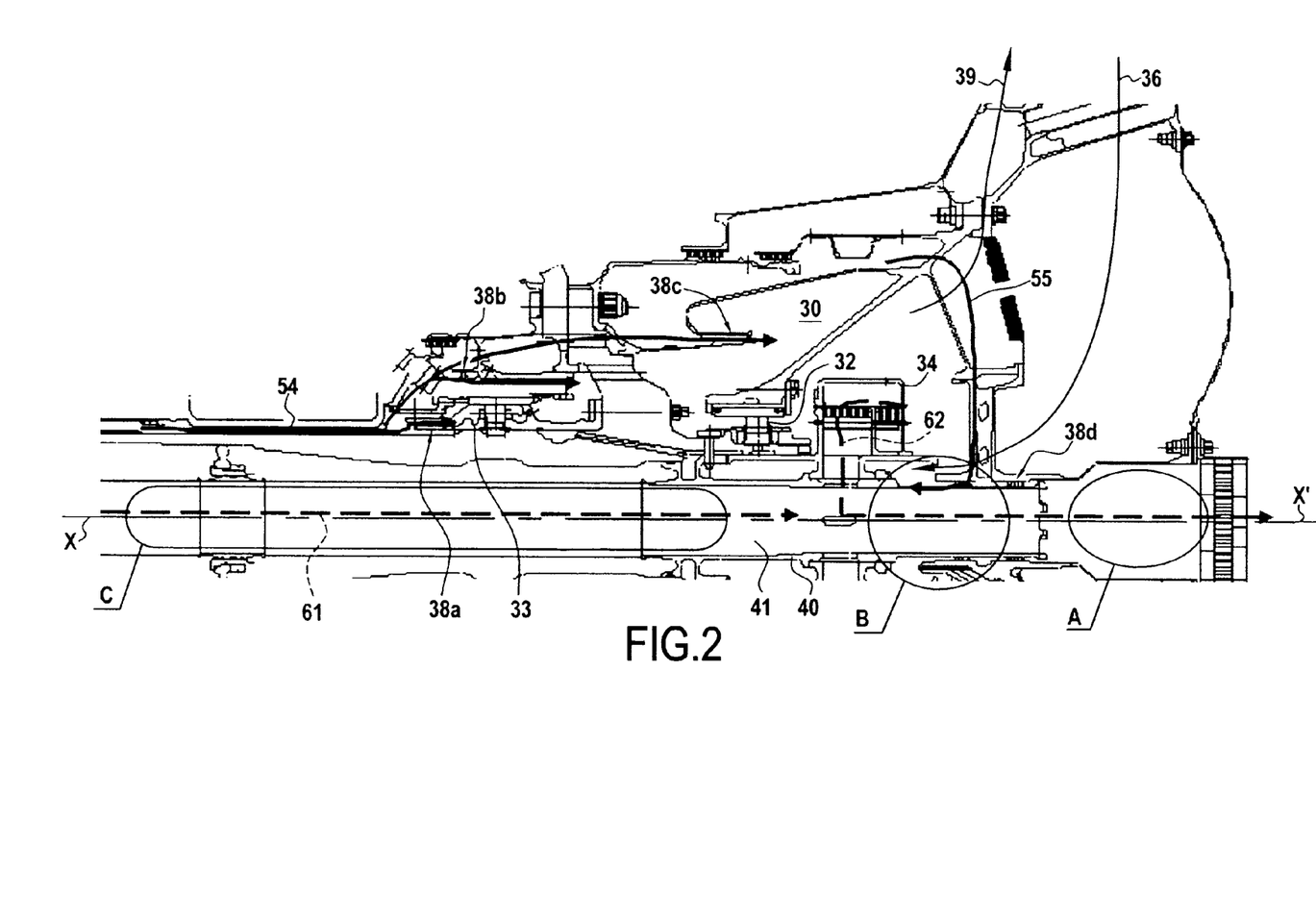
FIG. 2 is an axial section view of a prior art rear enclosure.

FIGS. 1 and 2 respectively show the front enclosure 20 containing the front bearings 21, 22, and 23, and the rear enclosure 30 containing the rear bearings 32 and 33 of a turbojet. For the enclosures, the low-pressure rotor 40 contains a duct 41 that removes both air and also a fraction of the lubricating oil entrained by the air and not retained by the de-oiler, this mixture having passed through the front enclosure 20 and the rear enclosure 30.

Figure 14:
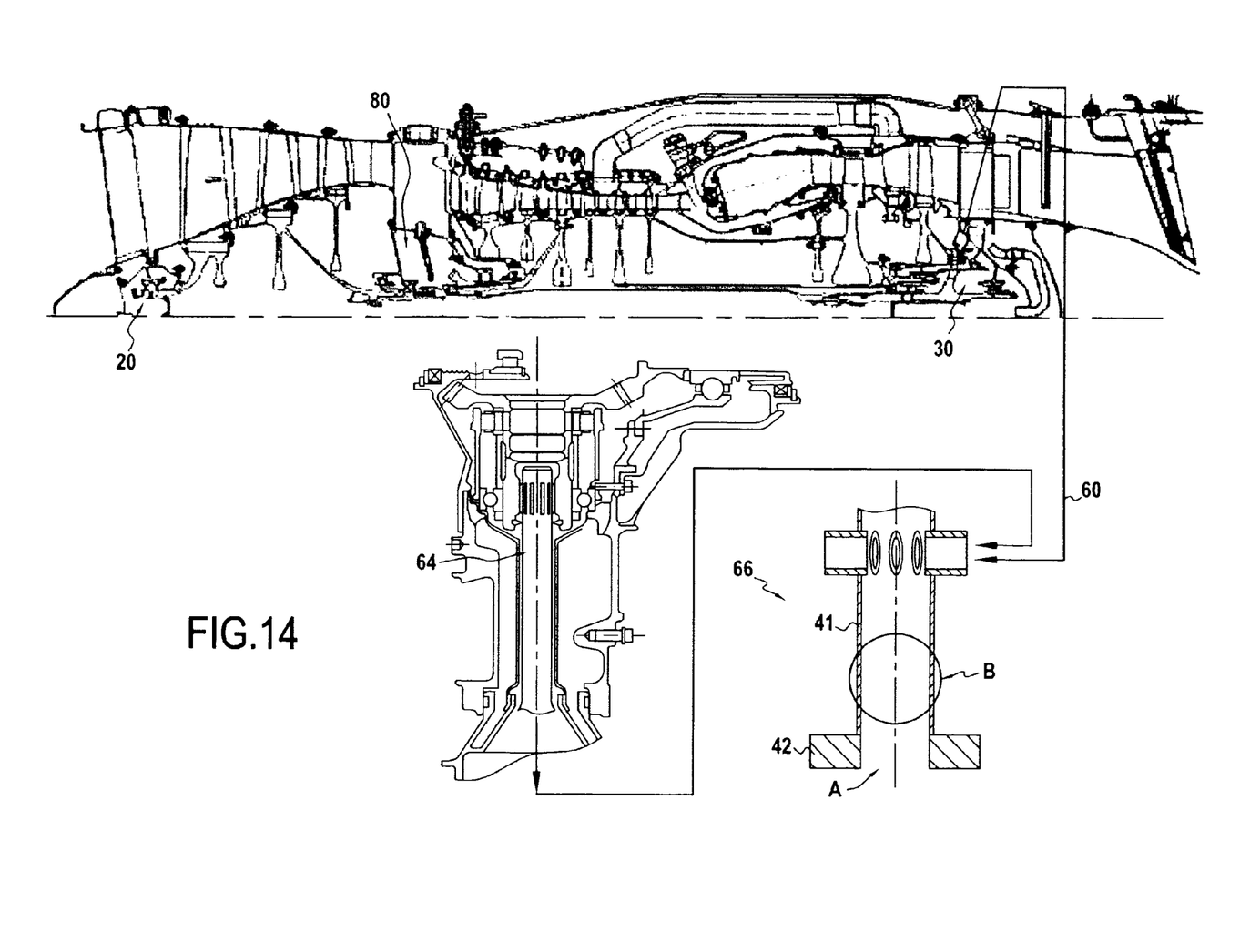
FIG. 14 is a half-view in axial section of a turbojet having three enclosures and an equipment support, in which engine the balancing device of the invention is placed at said equipment support.

The locations of these front and rear enclosures 20 and 30 in the turbojet can be seen in FIG. 14.

More precisely, as shown in FIG. 1, the pressurization circuit feeds the front enclosure 20 with three flows (arrows 51, 52, and 53 in solid lines) of pressurized air coming from the driving gas stream, while the front enclosure 20 receives the lubricating oil via spray nozzles.

This oil is essentially removed via a circuit for recovering lubricating liquid (arrow 29) from the front enclosure 20.

The air (mixed with the traces of residual oil) is removed (arrow 61 in dashed lines) by a chimney de-oiler 24 towards a center vent tube forming the duct 41 that is secured to or integral with the rotor 40 and that is coaxial (axis X-X') inside said rotor. Sealing systems formed of labyrinth seals are placed at the locations 28a, 28b, 28c, and 28d of the front enclosure 20 that correspond to the intakes of pressurized air.

The air present in the front enclosure 20 and the air removed by the rotor 40 is substantially at atmospheric pressure, ignoring the head loss of the venting circuit composed of the center vent tube situated downstream from the de-oiler 24. The higher the engine speed, the more the pressurized air P1 brought by the flows 51 to 53 of pressurization air is compressed. Thus, for the "cruising flight" and "full-throttle" speeds, the pressures of pressurization air P1 increase significantly relative to atmospheric pressure, thereby generating considerable differences in pressure at the boundaries of the sealing systems 28a, 28b, 28c, and 28d (approximately in the range 0.5 bars to 1 bar in most engines), and thus significant air flow rates that do not contribute to the thrust of the engine.

The rear enclosure 30 operates in the same manner by means of the flows (arrows 54 and 55 in solid lines) of pressurized air and by means of the oil intake (arrow 36) at the inlet. This oil is essentially removed via a circuit for recovering lubricating liquid (arrow 39) from the rear enclosure 30. The air (mixed with the traces of residual oil) is removed by a chimney de-oiler 34 towards the rotor 40 (arrow 62 in dashed lines), sealing systems formed of labyrinth seals being placed at the locations 38a, 38b, 38c, and 38d of the rear enclosure 30 that correspond to the intakes of pressurized air.

Figure 3:
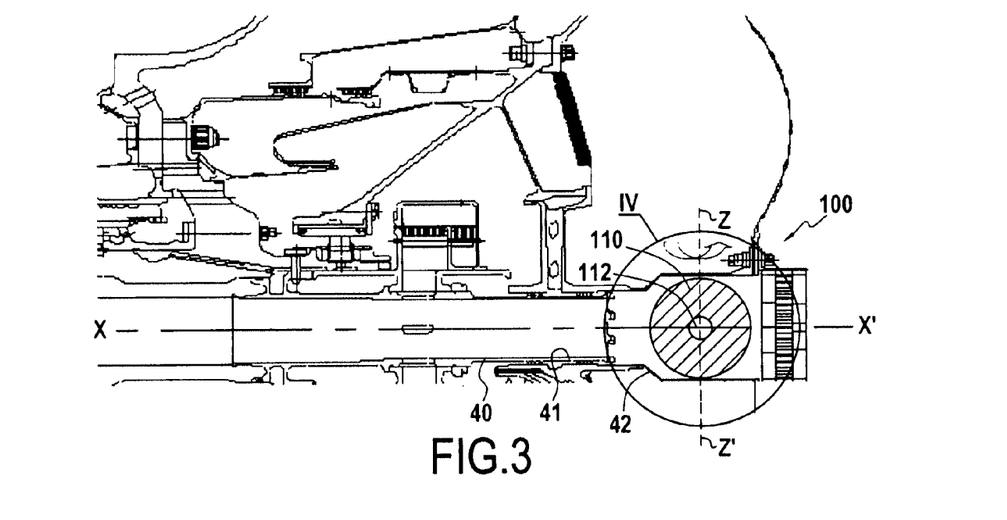
FIG. 3 is an axial section view on a larger scale of a portion of FIG. 2, showing a first embodiment of a balancing device, the regulator system being in an open position.
Figure 4:
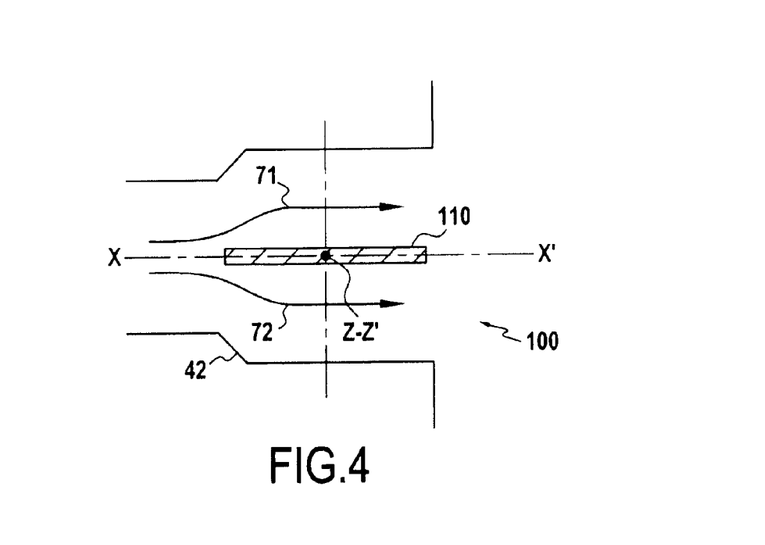
FIG. 4 is a plan view of the detail IV of FIG. 3.
Figure 5:
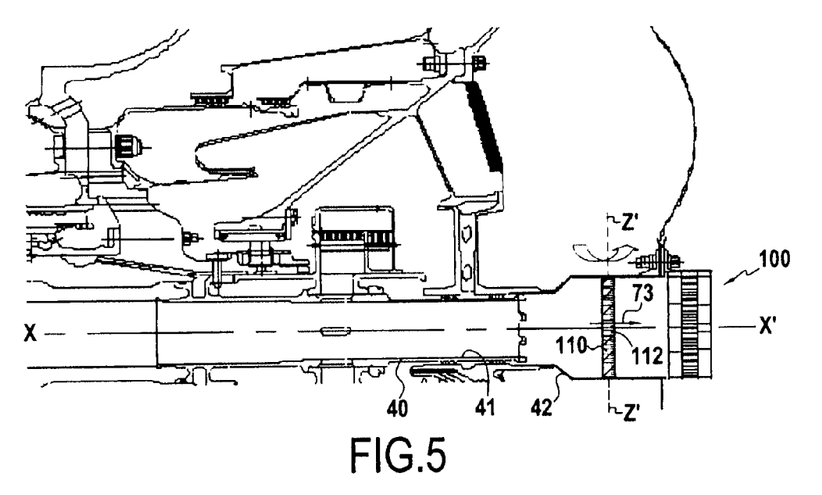
FIG. 5 is similar to FIG. 3, the regulator system of the balancing device being in a closed position.

Reference is made below to FIGS. 3 to 5 showing a first embodiment of the device of the invention that has been adapted to fit the structure of FIGS. 1 and 2, so that only the differences relative to FIGS. 1 and 2 are described below.

In this first embodiment, the duct 42, in which the shut-off member of the regulator system 100 is placed, is stationary, and said shut-off member 110 is connected to control means that are external to the duct 42 and that are suitable for controlling the position of the shut-off member 110 in the duct 42 as a function of engine speed.

This stationary duct 42 extends in alignment downstream from the rotary duct 41 that is constrained to rotate with the rotor 40.

As can be seen in FIGS. 3 to 5, the shut-off member 110 is a plate mounted to pivot about an axis Z-Z' that is perpendicular to the main direction X-X' of the duct 42, the main plane of said plate being disposed transversely in the duct 42 in the closed position (see FIG. 5), in which said non-zero minimum through flow section 112 remains between the plate and the wall of the duct 42 for passing the minimum flow rate of air, and the main plane of said plate being disposed parallel to the main direction X-X' of the duct 42 in the open position (see FIGS. 3 and 4).

Thus, when the shut-off member 110 is in the open position (see FIGS. 3 and 4), it is the edge of the disk forming the shut-off member 110 that engages the flow of air that splits to go on either side of the shut-off member 110 (arrows 71 and 72 in FIG. 4).

In this example, the shut-off member 110 is a circular plate (a disk) provided with a through hole at its center and having an outside diameter that is substantially equal to the inside diameter of the duct 42 in which the shut-off member 100 is placed.

The disk could be provided with a through hole at some other location, or could have an outside diameter smaller than the inside diameter of the duct 42. It is also possible to use a plate that is not circular.

It is desirable that, when the shut-off member 110 is in the closed position (FIG. 5), it does not fill the entire cross-section of the duct 42 in which it is placed so as to leave a minimum through flow section 112 enabling air to be removed (arrow 73 in FIG. 5).

The control means for controlling the angular position of the shut-off member 110 about the axis Z-Z' are not shown: they are external to the duct and they are connected to the shut-off member e.g. by a shaft mounted about the axis Z-Z'.

In a first possibility, the engine speed of one of the spools (low-pressure spool, intermediate-pressure spool, or high-pressure spool for current conventional engines) is the parameter chosen in view of the fact that it increases at the same time as does the pressure of the air coming to feed the front enclosure 20 and the rear enclosure 30. In another possibility, constituting a finer regulation mode, pressures are also used as regulation parameter(s) (e.g. the ambient pressure that is the delivery pressure of the removed air and/or internal driving pressures representative of the pressure of the pressurization air).

In this first embodiment, the shut-off member 110 is thus placed on a stationary portion of the motor in the path along which the pressurization air is removed from the enclosures. The angular position of the shut-off member 110 about the axis Z-Z' can thus vary as a function of the chosen engine parameters for the regulation (speed or pressure(s)). This variation in angular position causes a variation in the air flow section (in the flow rate of the air) and thus causes head losses in the system (the head losses corresponding to a function of the flow rate squared).

A second embodiment of the device of the invention is described below. In this embodiment, a passive and independent regulator system is used that takes account of the rotation of the rotor 40, the speed of which varies with varying engine speed, so as to cause the position of the shut-off member to vary, and thereby cause the air flow section in the duct to vary, and thus the air flow rate itself to vary.

For this purpose, the duct 41 is mounted to rotate due to the fact that it is secured to or integral with the low-pressure rotor 40, and said shut-off member is connected to control means that are integrated and associated with the moving duct 41 and that change the position of said shut-off member as a function of the speed of rotation of the rotor 40. In the above, the term "integrated" signifies that the control means for controlling said shut-off member are secured to or integral with the moving duct 41.

Such an arrangement is described below for three variant embodiments given as non-limiting examples.

Figure 6:
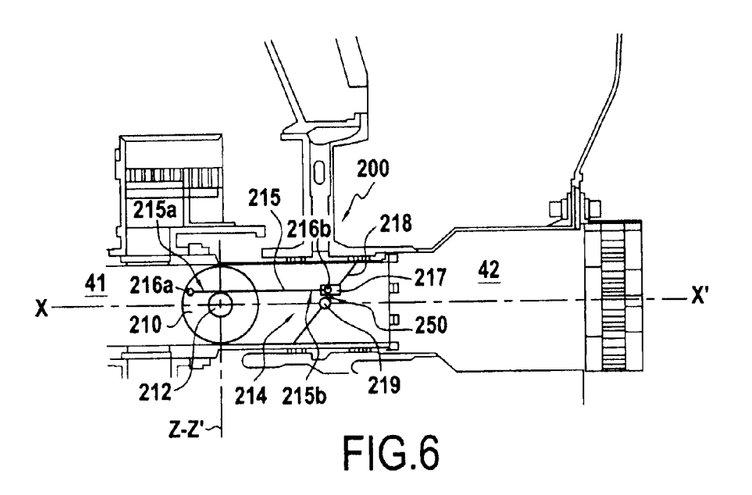
FIG. 6 is an enlarged section view of a portion of FIG. 2, showing a first variant of a second embodiment of a balancing device, the regulator system being in an open position.
Figure 7:
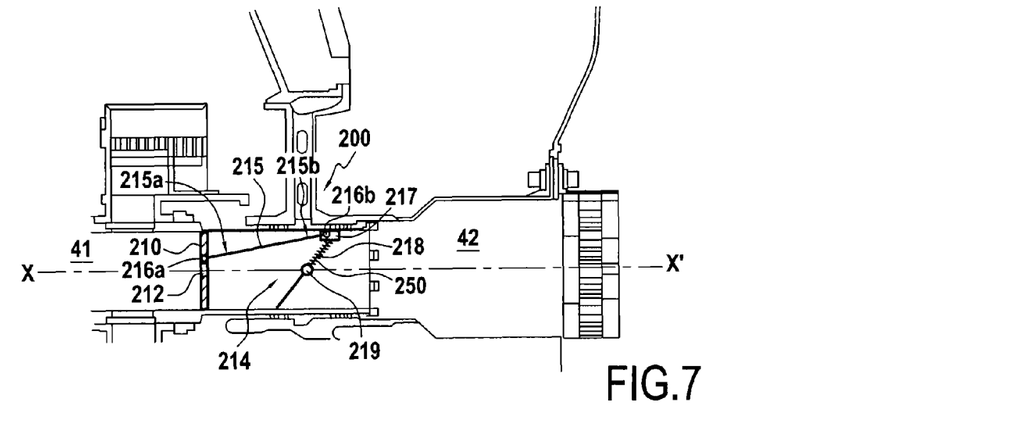
FIG. 7 is similar to FIG. 6, the regulator system of the balancing device being in a closed position.

In a first variant of the second embodiment, shown in FIGS. 6 and 7, use is made of a regulator system 200 including a shut-off member 210 of the same type as the shut-off member in the first embodiment and that is thus placed in the moving duct 41. In FIGS. 6 and 7, the shut-off member is also formed of a disk-shaped plate 210 provided with a through hole at its center (forming the minimum through flow section 212), this shut-off member 210 being mounted to move about an axis Z-Z' that is perpendicular to the axis of rotation X-X' of the rotor 40.

In this variant, the control means 214 are received in the moving duct 41 and they comprise a control rod 215 having one (215*a*) of its ends connected via a ball joint 216*a* to said plate 210, a flyweight 217 connected via a ball joint 216*b* to the other of the ends (215*b*) of the control rod 215 and provided with a through hole, and a drive rod 218 fastened to said duct 41 while being disposed in a direction that slants relative to a plane transverse to said duct 41, said flyweight 217 being mounted to slide via its through hole about said drive rod 218. For example, the two ends of the drive rods 218 are embedded in the walls of the duct 41.

Thus the flyweight 217 can move along the drive rod 218. The ball joint 216*a* between the plate 210 and the control rod 215 is provided in the vicinity of the edge of the plate 210, and in the vicinity of the diameter perpendicular to the axis Z-Z'.

In addition, an abutment 219 is used that is placed substantially in the middle of the length of the drive rod 218, and that defines the position of the flyweight 217, and thus the angular position of the plate 210, when the rotor 40 is at a standstill. Return means, shown by way of example in the form of a spring 250 in FIGS. 6 and 7, act between the abutment 219 and the flyweight 217. When the rotor ceases to rotate, the return means exert a return force that brings the flyweight 217 back to the abutment 219.

While the rotor 40 and the moving duct 41 are rotating, the centrifugal force that is exerted on the flyweight 217 makes it possible to overcome the return force generated by the spring 250, thereby enabling the flyweight 217 to move along the drive rod 218, and the higher the speed, the further the flyweight moves along the drive rod.

Since the flyweight 217 then moves with an axial component X-X', it acts, via the control rod 215, to drive the plate 210 to pivot about its axis Z-Z', and the higher the engine speed, the further said plate is caused to pivot. At maximum speed, the plate 210 finds itself in the closed position, perpendicular to the longitudinal axis X-X' of the rotor 40, as shown in FIG. 7.

The variation in the position of the plate 210 changes the air flow section in the duct 41, and thus changes the head losses.

The advantage of this solution with a shut-off member in the form of a plate 210 forming a valve member is that it proposes very low head loss in the open position, which head loss is no more than the obstruction formed by the edge of plate 210 and then downstream by the drive rod and by the flyweight 217.

Figure 8:
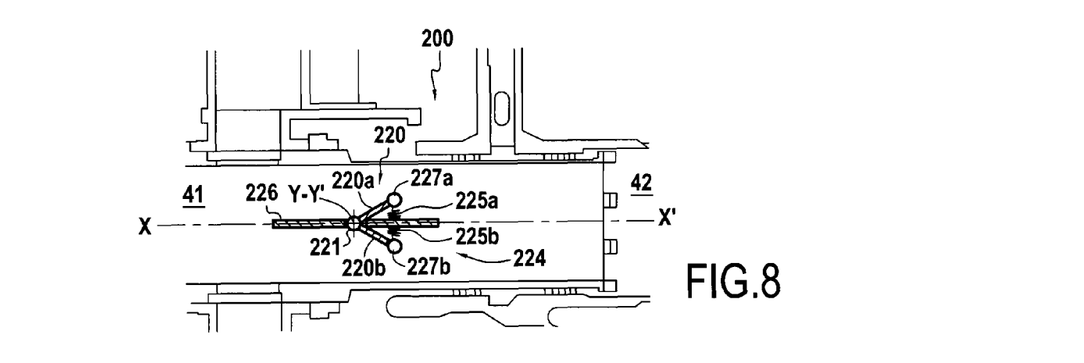
FIG. 8 is a view similar to FIG. 6, with a second variant of the second embodiment of a balancing device, the regulator system being in an open position.
Figure 9:
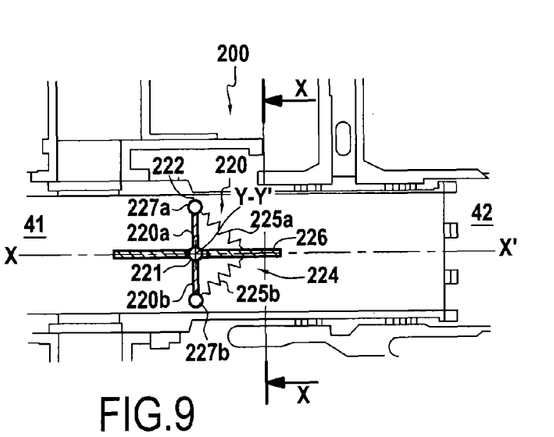
FIG. 9 is similar to FIG. 8, the regulator system of the balancing device being in a closed position.
Figure 10:
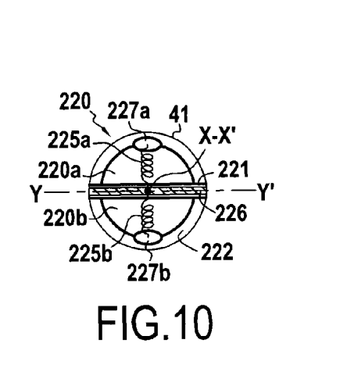
FIG. 10 is a fragmentary view seen looking in the direction X of FIG. 9, showing the regulator system of the balancing device in the closed position.

In a second variant of the second embodiment that can be seen in FIGS. 8 to 10, use is made of a regulator system 200 having a shut-off member 220 of a different type, but also placed inside the moving duct 41.

As can be seen in FIGS. 8 to 10, this shut-off member 220 has two flaps 220*a*, 220*b* mounted to pivot about a common shut-off member pin 221 disposed perpendicularly to the main direction (axis X-X') of the duct 41, along an axis Y-Y' (see FIG. 10). For example, the two ends of the shut-off member pin 221 are embedded in the walls of the duct 41.

In this example, the two flaps 220*a*, 220*b* are of semicircular shape, the diameter of the semicircles extending along the shut-off member pin 221 and being smaller than the diameter of the duct 41. In this way, when both of the flaps 220*a*, 220*b* are deployed, thereby putting the shut-off member 220 in its closed position (FIGS. 9 and 10), an annular air flow passage remains between the two flaps 220*a*, 220*b* and the inside face of the wall of the duct 41. This passage forms the minimum through flow section 222 making it possible to remove a sufficient quantity of air for all operating configurations, even in the event of failure (two flaps 220*a*, 220*b* jammed in the closed position).

It is possible to imagine the flaps 220*a*, 220*b* having a diameter equal to the inside diameter of the duct 41, but it is then desirable for one of them or for both of them to be provided with a through hole or with through holes so as to leave a minimum flow section through which the air can flow. Alternatively, said flaps 220*a*, 220*b* may have shapes other than semicircular.

In this variant, for each flap 220*a* (220*b*), the control means 224 comprise a spring 225*a* (225*b*) mounted between the flap 220*a* (220*b*) and a support 226. In this way, the flaps 220*a*, 220*b* open under the effect of the centrifugal force while the rotor 40 and the duct 41 are rotating, said springs 225*a*, 225*b* urging the flaps 220*a*, 220*b* back into the closed position.

In this example, the support 226 is a plate, parallel to a plane containing the axes X-X' and Y-Y', and mounted in the duct 41 at the location of one of the diameters thereof, in a direction parallel to the main direction (axis X-X') of the duct 41, in such a manner that only the edge of the plate forming said support 226 constitutes an obstacle (and thus head loss) for the flow of air through the duct 41. In the example shown, the shut-off member pin 221 is mounted on the support 226 but it is possible merely to align them in the main direction (axis X-X') of the duct 41.

The spring 225*a* (225*b*) connects the edge of the flap 220*a* (220*b*) that is remote from the shut-off member pin 221 to the support 226, downstream (behind) the shut-off member pin 221 (to the right in FIGS. 8 and 9) at a distance close to the half-diameter of each flap 220*a* (220*b*).

In this way, in the open position shown in FIG. 8, the two flaps 220*a*, 220*b* are folded away and reduce as little as possible the air flow section in the duct 41. This applies in particular for low engine speeds such as idling, when the low pressurization of the enclosures 20, requires head losses at the air circuit to be as low as possible.

The two flaps 220*a*, 220*b* then close again by moving apart under the effect of the centrifugal force (see FIG. 9), thereby reducing the air flow section to the annular minimum flow section 222, and increasing the head losses.

The two flaps 220*a*, 220*b* may optionally be provided with flyweights 227*a*, 227*b* (see FIGS. 8 and 9), the weight and locations of which are chosen (e.g. by initial trials) in order to optimize the head loss generated by the regulator system 200 for the various operating configurations.

It can be understood that the springs 225*a*, 225*b* constitute return means that urge the two flaps 220*a*, 220*b* back towards the support 226 in order to compensate for the centrifugal forces (see FIG. 9).

Figure 11:
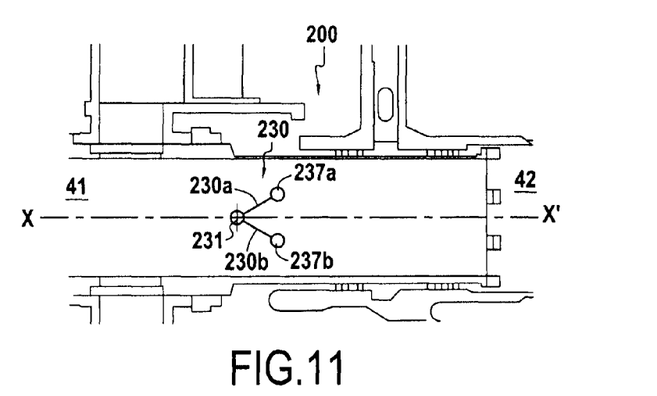
FIG. 11 is a view similar to FIG. 6 with a third variant of the second embodiment of a balancing device, the regulator system being in an open position.
Figure 12:
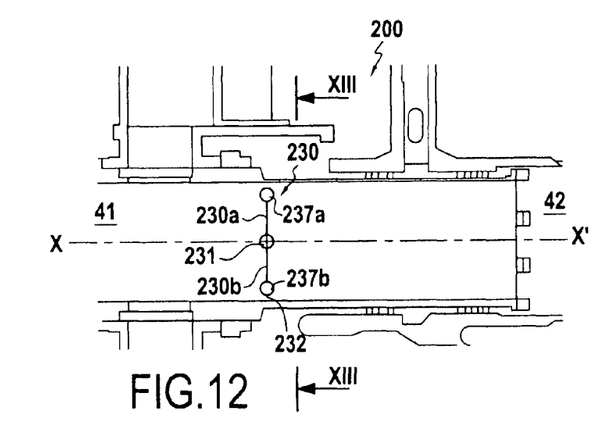
FIG. 12 is similar to FIG. 11, the regulator system of the balancing device being in a closed position.
Figure 13:
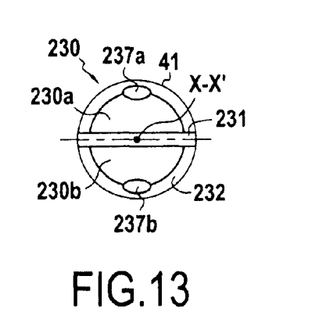
FIG. 13 is a fragmentary view seen looking in the direction XIII of FIG. 12, showing the regulator system of the balancing device in the closed position.

In a third variant of the second embodiment that can be seen in FIGS. 11 to 13, use is made of a regulator system 200 having a shut-off member 230 of a type slightly different from the above-described shut-off member in the second variant of the second embodiment. This regulator system 200 is also placed in the moving duct 41.

As can be seen, in FIGS. 11 to 13, said shut-off member 230 has two branches 230a, 230b mounted about a common shut-off member pin 231 disposed perpendicular to the main direction (axis X-X') of the duct 41, said branches 230a, 230b being made of an elastic material, so that the branches 230a, 230b open under the effect of the centrifugal force while the rotor 40 is rotating, and return to the closed position when the speed of rotation of the rotor 40 decreases.

In this example, the shut-off member 230 does not have two separate flaps, each of which is mounted to pivot about the axis 231, but rather the shut-off member 230 is a single resilient piece having two branches 230a, 230b and that is to be incorporated into the moving duct 41 of the rotor 40. The shut-off member pin 231 can be formed in one piece with the shut-off member 230 or else constitute a part that is different from the shut-off member 230 but that is fastened thereto.

The two ends of the shut-off member pin 231 are, for example, embedded in the walls of the duct 41.

On either side of the shut-off member pin 231, are to be found the two branches 230a, 230b (similar to half-valve-members) that are of semicircular shape in the example shown (see FIG. 13).

When the shut-off member 230 is at rest or in the open position, the two branches 230a, 230b are folded back towards each other about the shut-off member pin 231.

In general, at rest, the two branches 230a, 230b are in a configuration that reduces as little as possible the air flow section in the duct 41, at low speeds (e.g. while the engine is idling, when the low pressurization of the enclosures 20, 30 requires head loss at the air circuit to be as low as possible).

At higher engine speeds, the two flanges 230a, 230b deform elastically under the effect of the centrifugal force, and obstruct to a greater extent the air flow passage until they reach the closed position, shown in FIGS. 12 and 13 and in which the minimum flow section appears 232.

The two branches 230a, 230b resume their initial position (at rest) at the end of the deceleration, so that they remain effective throughout the large number of cycles performed on the engine. For this purpose, between the open position (FIG. 11) and the closed position (FIGS. 12 and 13) of the shut-off member 230, the fatigue elastic limit of the two branches 230a, 230b is not exceeded.

As in the second variant of the second embodiment, in this third variant, in optional manner, the regulator system 200 further includes a flyweight 237a, 237b mounted on each branch 230a, 230b, at a point of the branch 230a, 230b that is remote from the shut-off member pin 231.

In the examples described above with reference to the second embodiment, the balancing device of the invention is mounted in a turbojet having at least a front enclosure 20 and/or a rear enclosure 30 that has a venting circuit that, downstream from a de-oiler 24 or 34, comprises a duct 41 inside the low-pressure rotor 40, said turbojet being provided with a pressure-balancing device for which the regulator system 200 is mounted in the low-pressure rotor.

In the example described above with reference to the first embodiment, the balancing device of the invention is mounted in a turbojet having at least a front enclosure 20 and/or a rear enclosure 30, and a venting circuit that, downstream from the low-pressure rotor 40, comprises a stationary duct 42, the turbojet having a pressure-balancing device for which the regulator system 100 is mounted in said stationary duct 42.

In another configuration that can be seen in FIG. 14, the turbojet has at least a front bearing in a front enclosure 20 and a rear bearing in a rear enclosure 30, and, in this example, two intermediate bearings disposed in an intermediate enclosure 80. Downstream from all of these enclosures 20, 30, and 80, and downstream from the de-oiler 64, the venting circuit 60 includes a duct 41 that is mounted to rotate, and a duct 42 that is mounted to be stationary. In accordance with the invention, and in characteristic manner, the turbojet has a pressure-balancing device for which the regulator system 100 or 200 is mounted downstream from the de-oiler 64, either at the location A (stationary duct 42) of FIG. 14, for a first embodiment of the device, or at the location B of FIG. 14 (moving duct 41) for a second embodiment of the device.

In this situation, the de-oiler 64 downstream from which the regulator system 100 or 200 is mounted is itself advantageously mounted in the enclosure 66 of an accessory gearbox (AGB) or of some other equipment support.

With reference to FIGS. 1 and 2, it appears that the above-described solutions are put in place at the location A of FIG. 2 when the solution is the first embodiment (stationary duct 42), or at the location B of FIG. 2 when the solution is the second embodiment (moving duct 41).

These choices of installation location are not limiting, and it is also possible to consider installing a second embodiment of a pressure-balancing device of the invention further upstream from the rotor 40, in particular in the zone C of FIGS. 1 and 2, i.e. after the de-oiler 24 of the front enclosure 20. However, in this situation, only the flow of air entering the front enclosure 20 is affected by the device of the invention.

It is also possible to make provision for installing pressure-balancing devices of the invention at two locations: both downstream from the de-oiler 34 of the rear enclosure 30 as described with reference to FIGS. 3 to 13 (at the location A of FIG. 2 when the first embodiment is installed or at the location B of FIG. 2 when the second embodiment is installed), and also downstream from the de-oiler 24 of the front enclosure 20 (zone C in FIGS. 1 and 2) by placing thereat a second embodiment of the pressure-balancing device of the invention or indeed, more simply, a diaphragm with a constant small flow section.

It should be noted that the pressure-balancing device of the invention is applicable for enclosures using labyrinth-type seals as sealing systems, thereby improving their sealing capability by reducing the pressure difference between the enclosure and the outside of the enclosure, but the device of the invention is also applicable for advanced sealing systems, thereby improving the performance of such systems.

The invention claimed is:

1. A pressure-balancing device for balancing pressure in at least one bearing enclosure of a turbojet, said enclosure being defined between a rotor mounted to rotate about an axis and a stator including a bearing support on which a bearing is mounted that bears against said rotor, said enclosure including a device for feeding said bearing with lubricating liquid, an air intake bringing into the enclosure pressurized air coming from a pressurization circuit, at least one sealing system placed between the stator and the rotor in front of and/or behind said bearing, a recovery system for recovering the lubricating liquid and a removal system for removing the air towards a venting circuit, wherein downstream from the bearing enclosure and in a duct of the venting circuit, said device comprises:

a regulator system for regulating the flow rate of air removal that, as a function of engine speed, changes the flow section of the duct between a non-zero minimum flow section and a maximum flow section thus enabling said flow rate to be variable as a function of engine speed, to remain non-zero, and, at high speeds, to be lower than when the regulator system is absent, and wherein said regulator system includes a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position, and wherein the air removal flow rate is at a non-zero minimum value for low engine speed and is variable, increasing with increasing engine speed up to a maximum air removal flow rate.

2. A device according to claim 1, wherein the duct is stationary, and wherein said shut-off member is connected to a controller external to the duct and suitable for controlling the position of the shut-off member in the duct as a function of the engine speed.

3. A device according to claim 2, wherein the shut-off member is a plate mounted to pivot about an axis that is perpendicular to the main direction of the duct, the main plane of said plate being disposed transversely in the duct in the closed position in which there remains said minimum non-zero flow section between the plate and the wall of the duct for passing the minimum air flow rate, and the main plane of said plate being disposed parallel to the main direction of the duct in the open position.

4. A device according to claim 3, wherein the shut-off member is a circular plate provided with a through hole and having an outside diameter that is substantially equal to the inside diameter of the duct.

5. A turbojet comprising:
at least a front enclosure and/or a rear enclosure, downstream from which, and downstream from a de-oiler, the venting circuit includes a duct mounted to rotate and a duct mounted to be stationary, wherein it includes a device according to claim 1, for which the regulator system is mounted downstream from the de-oiler.

6. A turbojet according to claim 5, wherein the de-oiler is mounted in an equipment support.

7. A pressure-balancing device for balancing pressure in at least one bearing enclosure of a turbojet, said enclosure being defined between a rotor mounted to rotate about an axis and a stator including a bearing support on which a bearing is mounted that bears against said rotor, said enclosure including a device for feeding said bearing with lubricating liquid, an air intake bringing into the enclosure pressurized air coming from a pressurization circuit, at least one sealing system placed between the stator and the rotor in front of and/or behind said bearing, a recovery system for recovering the lubricating liquid and a removal system for removing the air towards a venting circuit, wherein downstream from the bearing enclosure and in a duct of the venting circuit, said device comprises:
a regulator system for regulating the flow rate of air removal that, as a function of engine speed, changes the flow section of the duct between a non-zero minimum flow section and a maximum flow section thus enabling said flow rate to be variable as a function of engine speed, to remain non-zero, and, at high speeds, to be lower than when the regulator system is absent, and
wherein said regulator system includes a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position, wherein the duct is mounted to rotate by the fact that it is fastened to the rotor and is thus driven in rotation by said rotor, and wherein said shut-off member is connected to a controller incorporated into the duct and changing the position of said shut-off member as a function of the speed of rotation of the rotor that varies with varying engine speed.

8. A device according to claim 7, wherein the shut-off member is a plate mounted to pivot about an axis that is perpendicular to the main direction of the duct, the main plane of said plate being disposed transversely in the duct in the closed position in which there remains said minimum non-zero flow section between the plate and the wall of the duct for passing the minimum air flow rate, and the main plane of said plate being disposed parallel to the main direction of the duct in the open position and wherein the control means comprise a control rod having one of its ends connected via a ball joint to said plate, a flyweight connected via a ball joint to the other of the ends of the control rod and provided with a through hole, and a drive rod fastened to said duct while being disposed in a direction that slants relative to a plane transverse to said duct, said flyweight being mounted to slide about said drive rod.

9. A device according to claim 7, wherein said shut-off member has two flaps mounted to pivot about a common shut-off member pin disposed perpendicularly to the main direction of the duct, and wherein, for each flap, the controller comprise a spring mounted between the flap and a support, so that the flaps open under the effect of the centrifugal force while the rotor is rotating, said springs urging the flaps back into the closed position.

10. A device according to claim 9, wherein it further includes a flyweight mounted on each flap or branch of the shut-off member.

11. A device according to claim 7, wherein said shut-off member has two branches mounted around a common shut-off member pin disposed perpendicularly to the main direction of the duct, said branches being made of an elastic material, so that the branches open under the effect of the centrifugal force while the rotor is rotating, and return to the closed position when the speed of rotation of the rotor decreases.

12. A turbojet comprising:
at least a front enclosure and/or a rear enclosure including a venting circuit that, downstream from a de-oiler, includes a duct inside the low-pressure rotor, wherein it includes a pressure-balancing device for balancing pressure in at least one bearing enclosure of said turbojet, said enclosure being defined between a rotor mounted to rotate about an axis and a stator including a bearing support on which a bearing is mounted that bears against said rotor, said enclosure including a device for feeding said bearing with lubricating liquid, an air intake bringing into the enclosure pressurized air coming from a pressurization circuit, at least one sealing system placed between the stator and the rotor in front of and/or behind said bearing, a recovery system for recovering the lubricating liquid and a removal system for removing the air towards a venting circuit, wherein downstream from the bearing enclosure and in a duct of the venting circuit, said pressure-balancing device includes a regulator system for regulating the flow rate of air removal that, as a function of engine speed, changes the flow section of the duct between a non-zero minimum flow section and a maximum flow section thus enabling said flow rate to be variable as a function of engine speed, to remain non-zero, and, at high speeds, to be lower than when the regulator system is absent, and wherein said regulator system includes a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position, wherein the duct is mounted to rotate by the fact that it is fastened to the rotor and is thus driven in rotation by said rotor, and wherein said shut-off member is connected to a controller incorporated into the duct and changing the position of said shut-off member as a function of the speed of rotation of the rotor that varies with varying engine speed, for which pressure-balancing device the regulator system is mounted in the low-pressure rotor.

13. A turbojet comprising:

at least a front enclosure and/or a rear enclosure including a venting circuit that, downstream from the low-pressure rotor, includes a stationary duct, wherein it includes a pressure-balancing device for balancing pressure in at least one bearing enclosure of said turbojet, said enclosure being defined between a rotor mounted to rotate about an axis and a stator including a bearing support on which a bearing is mounted that bears against said rotor, said enclosure including a device for feeding said bearing with lubricating liquid, an air intake bringing into the enclosure pressurized air coming from a pressurization circuit, at least one sealing system placed between the stator and the rotor in front of and/or behind said bearing, a recovery system for recovering the lubricating liquid and a removal system for removing the air towards a venting circuit, wherein downstream from the bearing enclosure and in a duct of the venting circuit, said pressure-balancing device includes a regulator system for regulating the flow rate of air removal that, as a function of engine speed, changes the flow section of the duct between a non-zero minimum flow section and a maximum flow section thus enabling said flow rate to be variable as a function of engine speed, to remain non-zero, and, at high speeds, to be lower than when the regulator system is absent, and wherein said regulator system includes a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position, for which pressure-balancing device the regulator system is mounted in said stationary duct, and wherein the air removal flow rate is at a non-zero minimum value for low engine speed and is available, increasing with increasing engine speed up to a maximum air removal flow rate.

14. A method of balancing pressure in at least one bearing enclosure of a turbojet, said enclosure being defined between a rotor mounted to rotate about an axis and a stator including a bearing support on which a bearing is mounted that bears against said rotor, said enclosure including a device for feeding said bearing with lubricating liquid, an air intake bringing into the enclosure pressurized air coming from a pressurization circuit, at least one sealing system placed between the stator and the rotor in front of and/or behind said bearing, a recovery system for recovering the lubricating liquid and a removal system for removing the air towards a venting circuit, the method comprising:

regulating, as a function of engine speed, the air removal flow rate downstream from the bearing enclosure, in a duct of the venting circuit; and changing as a function of engine speed, the flow section of the duct between a minimum flow section that is not zero and a maximum flow, by which said air flow rate is variable as a function of the speed of the engine, non-zero, and, at high speeds, lower than when the flow rate of air is not regulated, and wherein said flow rate is regulated by a shut-off member mounted to move between a closed position in which said shut-off member occupies a large fraction of the section of the duct that then has a minimum flow section and an open position in which said shut-off member occupies a small fraction of the section of the duct that then has a maximum flow section, it being possible for said shut-off member to take up any intermediate position between said closed position and said open position, and wherein the air removal flow rate is at a non-zero minimum value for low engine speed and is variable, increasing with increasing engine speed up to a maximum air removal flow rate.

15. A turbojet comprising:

at least a front enclosure and/or a rear enclosure, downstream from which, and downstream from a de-oiler, the venting circuit includes a duct mounted to rotate and a duct mounted to be stationary, wherein it includes a device according to claim 7, for which the regulator system is mounted downstream from the de-oiler.

\* \* \* \* \*